(12) United States Patent
Wamprecht et al.

(10) Patent No.: US 9,593,199 B2
(45) Date of Patent: *Mar. 14, 2017

(54) PRODUCTION AND USE OF NEW THERMOPLASTIC POLYURETHANE ELASTOMERS BASED ON POLYETHER CARBONATE POLYOLS

(71) Applicant: Covestro Deutschland AG, Leverkusen (DE)

(72) Inventors: Christian Wamprecht, Neuss (DE); Wolfgang Kaufhold, Köln (DE); Christoph Gürtler, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,571

(22) PCT Filed: Oct. 14, 2013

(86) PCT No.: PCT/EP2013/071416
§ 371 (c)(1),
(2) Date: Apr. 9, 2015

(87) PCT Pub. No.: WO2014/060348
PCT Pub. Date: Apr. 24, 2014

(65) Prior Publication Data
US 2015/0232606 A1    Aug. 20, 2015

(30) Foreign Application Priority Data
Oct. 16, 2012   (DE) .................. 10 2012 218 846

(51) Int. Cl.
C08G 18/73    (2006.01)
C08G 18/32    (2006.01)
C08G 18/24    (2006.01)
C08G 18/40    (2006.01)
C08G 18/48    (2006.01)
C08G 18/44    (2006.01)
C08G 18/76    (2006.01)

(52) U.S. Cl.
CPC .......... C08G 18/73 (2013.01); C08G 18/246 (2013.01); C08G 18/3206 (2013.01); C08G 18/4018 (2013.01); C08G 18/44 (2013.01); C08G 18/4808 (2013.01); C08G 18/4837 (2013.01); C08G 18/7671 (2013.01)

(58) Field of Classification Search
CPC .......... C08G 18/4018; C08G 18/4808; C08G 18/4837; C08G 18/7671; C08G 18/44
See application file for complete search history.

(56) References Cited

U.S. PATENT DOCUMENTS

| | | | |
|---|---|---|---|
| 3,404,109 A | 10/1968 | Milgrom | |
| 3,642,964 A | 2/1972 | Rausch, Jr. et al. | |
| 3,829,505 A | 8/1974 | Herold | |
| 3,941,849 A | 3/1976 | Herold | |
| 5,158,922 A | 10/1992 | Hinney et al. | |
| 5,470,813 A | 11/1995 | Le-Khac | |
| 5,795,948 A | 8/1998 | Heidingsfeld et al. | |
| 6,518,389 B1 * | 2/2003 | Kaufhold | C08G 18/0895 528/59 |
| 6,624,278 B2 | 9/2003 | Müller et al. | |
| 6,713,599 B1 * | 3/2004 | Hinz | C08G 18/4866 528/403 |
| 6,767,986 B2 | 7/2004 | Moethrath et al. | |
| 6,987,160 B2 | 1/2006 | Tanaka et al. | |
| 7,008,900 B1 | 3/2006 | Hofmann et al. | |
| 8,324,419 B2 | 12/2012 | Mijolovic et al. | |
| 2004/0092699 A1 | 5/2004 | Ueno et al. | |
| 2008/0139776 A1 | 6/2008 | Scholz et al. | |
| 2012/0095122 A1 | 4/2012 | Zhou et al. | |
| 2013/0059973 A1 * | 3/2013 | Wamprecht | C08G 18/10 524/590 |

FOREIGN PATENT DOCUMENTS

| | | | | |
|---|---|---|---|---|
| DE | 2059570 A1 | 6/1971 | | |
| DE | 1 964 834 A1 | 7/1971 | | |
| DE | 1964834 A1 * | 7/1971 | ......... | C08G 18/0852 |
| DE | 29 01 774 A1 | 7/1980 | | |
| DE | 10061067 C1 | 6/2002 | | |
| DE | 10147711 A1 | 4/2003 | | |
| DE | 102005004967 A1 | 8/2006 | | |
| EP | 0 222 453 A2 | 5/1987 | | |
| EP | 0700949 A2 | 3/1996 | | |
| EP | 0743093 A1 | 11/1996 | | |
| EP | 0761708 A2 | 3/1997 | | |
| EP | 1359177 A1 | 11/2003 | | |

(Continued)

OTHER PUBLICATIONS

International Search Report for PCT/EP2013/071416 mailed May 15, 2014.

Primary Examiner — Michael L Leonard
(74) Attorney, Agent, or Firm — K&L Gates LLP

(57) ABSTRACT

The invention relates to a method for producing a thermoplastic polyurethane elastomer, comprising the reaction of at least A) one organic diisocyanate containing two isocyanate groups with B) a polyol having a number-average molecular weight $Mn \geq 500$ and $\leq 5000$ g/mol, which has at least two isocyanate-reactive groups, and C) one or more chain extenders having a molecular weight $\geq 60$ and $\leq 490$ g/mol, which have two isocyanate-reactive groups, and optionally D) a monofunctional chain stopper, which has one isocyanate-reactive group, and/or E) a catalyst, wherein the molar ratio of the isocyanate groups from A) to the sum of the groups reactive to isocyanate in B), C), and, if applicable, D) is $\geq 0.9:1$ and $\leq 1.2:1$, and component B) contains at least one polyether carbonate polyol, which can be obtained by adding carbon dioxide and alkylene oxides to H-functional starter substances. The invention further relates to a thermoplastic polyurethane elastomer produced in accordance with the method according to the invention, the use of said thermoplastic polyurethane elastomer to produce extruded or injection molded items, and the items produced by extrusion or injection molding.

15 Claims, No Drawings

(56) References Cited

FOREIGN PATENT DOCUMENTS

| | | |
|---|---|---|
| EP | 1 707 586 A1 | 10/2006 |
| EP | 2115032 A1 | 11/2009 |
| GB | 1057018 A | 2/1967 |
| WO | WO-97/40086 A1 | 10/1997 |
| WO | WO-98/16310 A1 | 4/1998 |
| WO | WO-00/47649 A1 | 8/2000 |
| WO | WO-2008/013731 A1 | 1/2008 |
| WO | WO 2008013731 A1 * | 1/2008 ........... C08G 64/183 |
| WO | WO-2010028362 A1 | 3/2010 |
| WO | WO-2010/115567 A1 | 10/2010 |

* cited by examiner

PRODUCTION AND USE OF NEW THERMOPLASTIC POLYURETHANE ELASTOMERS BASED ON POLYETHER CARBONATE POLYOLS

CROSS-REFERENCE TO RELATED APPLICATIONS

This application is a national stage application (under 35 U.S.C. §371) of PCT/EP2013/071416, filed Oct. 14, 2013, which claims benefit of German Application No. 102012218846.0, filed Oct. 16, 2012, both of which are incorporated herein by reference in their entirety.

The invention relates to a process for the production of a thermoplastic polyurethane elastomer based on polyether carbonate polyols. The invention further relates to a thermoplastic polyurethane elastomer produced by the process of the invention, the use thereof for the production of extruded or injection-molded items, and also the items produced via extrusion or injection molding.

Thermoplastic polyurethane elastomers (TPUs) are of great importance in industry because they have excellent mechanical properties and can be processed by thermoplastic methods at low cost. Their mechanical properties can be varied widely via the use of different chemical structural components. Kunststoffe [plastics] 68 (1978), pp. 819-825 and Kautschuk, Gummi, Kunststoffe [Rubber, Natural Rubber, Plastics] 35 (1982), pp. 568-584 provide overviews of TPUs, and their properties and uses.

TPUs are composed of linear polyols, mostly polyester polyols, polyether polyols, or polycarbonate polyols, organic diisocyanates, and short-chain compounds having two isocyanate-reactive groups (chain extenders). It is also possible to add catalysts in order to accelerate the formative reaction. The molar ratios of the structural components can be varied widely, and by this means it is possible to adjust the properties of the products. Products obtained have a wide range of Shore hardness, depending on the molar ratios of polyols to chain extenders. The thermoplastically processible polyurethane elastomers can be constructed either stepwise (prepolymer process) or via simultaneous reaction of all of the components in one stage (one-shot process). The TPUs can be produced continuously or batchwise. The best-known industrial production processes are the belt process and the extruder process.

TPUs based on polyethylene oxide polyols and/or on polypropylene oxide polyols (C2 and, respectively, C3 polyether polyols) can be produced via polymerization of ethylene oxide and/or propylene oxide by known processes with KOH catalysis or multimetal cyanide catalysis (DMC catalysis), and feature a good overall property profile. Particular mention may be made of rapid solidification after injection molding, and also very good hydrolysis resistance and microbial resistance of the resultant manufactured components. These TPU materials require improvement in respect of mechanical properties, e.g. tensile strength, tensile strain value, and abrasion resistance, and also thermal properties, e.g. heat resistance.

These improvements have hitherto been achieved by way of example via the use of polyester polyols, polycarbonate polyols, or C4-polyether polyols (polytetramethylene glycols). However, the two last-mentioned polymeric polyols have a complicated production process and are composed to some extent of expensive starting materials, and are therefore also markedly more expensive than C2- or C3-polyether polyols. Polyester polyols have the disadvantage of susceptibility to hydrolysis.

DE 10147711 A describes a process for the production of polyether alcohols made of oxirane compounds in the presence of DMC catalysts and of a moderator gas, e.g. carbon dioxide, carbon monoxide, hydrogen, and dinitrogen oxide. The low pressures used during the synthesis lead to maximal incorporation of $CO_2$ of 20 mol %, and the number of carbonate units present in the polyether polyols is therefore very small. The resultant polyether polyols can also be used for the production of thermoplastic polyurethane elastomers, but the very small proportion of carbonate units is unlikely to give any improvement of properties.

In *J. Appl. Polym Sci.* 2007, Vol, 104, pp, 3818-3826, S. Xu and M. Zhang describe the two-stage production of elastomers based on polyethylene carbonate polyols which are produced via copolymerization of ethylene oxide with $CO_2$ in the presence of a polymer-supported bimetal catalyst. The high proportion of units resulting from ethylene oxide in the elastomer leads to highly hydrophilic properties which make these materials unsuitable for many application sectors.

WO2010/115567 A describes the production of microcellular elastomers via reaction of an NCO-terminated prepolymer, produced from an isocyanate and a first polyol, with a second polyol with a number-average molar mass $M_n$ of from 1000 to 10 000 g/mol and a chain extender with a molar mass below 800 g/mol. The microcellular structure is generated via the use of chemical or physical blowing agents, for example water. Polyols used can be polyether carbonate polyols produced via copolymerization of $CO_2$ and alkylene oxides. Microcellular structures brought about via the use of blowing agents are undesirable when TPUs are processed in injection-molding machines and when extrusion processes are used, because they give a lower level of mechanical properties, in particular tensile strength and tensile strain at break, and/or defects arise in the production of foils.

EP 1 707 586 A discloses the multistage production of polyurethane resins which are based on polyether carbonate diols produced via transesterification of carbonate esters, e.g. dimethyl carbonate, with polyether diols having a molar mass below 500 g/mol. A complicated, 2-stage synthesis is used to produce the products. This lengthy transesterification process often leads to undesired product discoloration and, because of side reactions (elimination of water with formation of double bonds) to OH functionalities <2 (mostly from 1.92 to 1.96), thus producing TPU products with relatively low molecular weight. The level of mechanical properties is then therefore also lower than for glycols with high OH functionality (from 1.98 to 2.00).

It was therefore an object of the present invention to provide a process for the production of low-cost thermoplastic polyurethane elastomers which have a good overall property profile and also a particularly high level of mechanical properties, and are thus suitable for a wide range of applications. A particular intention is that the TPUs produced have not only increased tensile strength but also particularly low abrasion values and improved heat resistance in comparison with the corresponding TPUs known from the prior art, based on pure C2- or C3-polyether polyols.

The invention achieves said object via a process for the production of a thermoplastic polyurethane elastomer comprising the reaction of at least A) one organic diisocyanate comprising two isocyanate groups with B) one polyol with number-average molar mass ≥500 and <5000 g/mol, which has at least two isocyanate-reactive groups, and C) one chain extender with molar mass ≥60 and <490 g/mol, which has two isocyanate-reactive groups,
and optionally
D) a monofunctional chain terminator which has an isocyanate-reactive group and/or
E) a catalyst,
where the molar ratio of the isocyanate groups from A) to the entirety of the isocyanate-reactive groups in B), C), and optionally D) is ≥0.9:1 and ≤1.2:1
and component B) comprises at least one polyether carbonate polyol obtainable via an addition reaction of carbon dioxide and alkylene oxides onto H-functional starter substances.

Surprisingly, it has been found that the TPUs produced by the process of the invention have good mechanical properties. In particular they are found to have higher tensile strength and better thermal stability than corresponding TPUs based on pure C2- or C3-polyether polyols, and the abrasion values are also significantly lower. The TPUs produced in the invention also retain very good elastic properties at low temperatures, because no soft-segment crystallization occurs.

For the purposes of the invention, thermoplastic polyurethane elastomers are elastomers which can be processed by a thermoplastic route and which comprise urethane units. These are linear multiphase block copolymers composed of what are known as hard and soft segments.

Hard segments are segments formed by the rigid blocks of the copolymer, these being produced by reaction of short-chain chain extenders and diisocyanates. These blocks have an ordered arrangement, permitted via physical interaction with the chain-extender blocks of the adjacent polymer chain. These interactions provide the modes for the elastic properties. At the same time, reversible disintegration of these modes on melting is the precondition for the thermoplastic properties.

Reaction of the longer-chain polyol components with diisocyanates produces flexible blocks in the copolymer which form the soft segments, which have no ordered arrangement. These are responsible for the chemical properties of the TPU, and also for its low-temperature flexibility.

Organic diisocyanates A) that can be used are by way of example diisocyanates described in Justus Liebigs *Annalen der Chemie,* 562, pp. 75-136.

Specific mention may be made of the following by way of example:

Aromatic diisocyanates, for example tolylene 2,4-diisocyanate, tolylene 2,4-diisocyanate/tolylene 2,6-diisocyanate mixtures, diphenylmethane 4,4'-diisocyanate diphenylmethane 2,4'-diisocyanate, and diphenylmethane 2,2'-diisocyanate, diphenylmethane 2,4'-diisocyanate/diphenylmethane 4,4'-diisocyanate mixtures, urethane-modified liquid diphenylmethane 4,4-diisocyanates and diphenylmethane 2,4'-diisocyanates, 4,4'-diisocyanato-1,2-diphenylethane, and naphthylene 1,5-diisocyanate. It is preferable to use, as aromatic organic diisocyanates, diphenylmethane diisocyanate isomer mixtures with >96% by weight content of diphenylmethane 4,4'-diisocyanate, and in particular diphenylmethane 4,4'-diisocyanate and naphthylene 1,5-diisocyanate. The diisocyanates mentioned can be used individually or in the form of mixtures with one another. They can also be used together with up to 15% by weight (based on the total quantity of diisocyanate) of a polyisocyanate, for example triphenylmethane 4,4',4''-triisocyanate or with polyphenyl polymethylene polyisocyanates.

Other diisocyanates A) that can be used are aliphatic and cycloaliphatic diisocyanates. Mention may be made by way of example of hexamethylene diisocyanate, isophorone diisocyanate, cyclohexane 1,4-diisocyanate, 1-methylcyclohexane 2,4-diisocyanate, and 1-methylcyclohexane 2,6-diisocyanate, and also the corresponding isomer mixtures, and dicyclohexylmethane 4,4'-, 2,4'-, and 2,2'-diisocyanate, and also the corresponding isomer mixtures. It is preferable that the aliphatic organic diisocyanate used is composed of at least 50% by weight of hexamethylene 1,6-diisocyanate, with preference 75% by weight, and particularly preferably 100% by weight.

In one preferred embodiment of the invention, the organic diisocyanate A) comprises at least one compound selected from the group of aliphatic, aromatic, cycloaliphatic diisocyanates, and particularly preferably at least one aliphatic and/or one cycloaliphatic diisocyanate, very particularly preferably at least one aliphatic diisocyanate.

In the invention, component B) comprises at least one polyether carbonate polyol obtainable via an addition reaction of carbon dioxide and of alkylene oxides onto H-functional starter substances. For the purposes of the invention "H-functional" means a starter compound which has H atoms that are active in relation to alkoxylation.

The production of polyether carbonate polyols via an addition reaction of alkylene oxides and $CO_2$ onto H-functional starters is known by way of example from EP 0222453 A, WO 2008/013731 A, and EP 2115032 A.

In one preferred embodiment of the invention, the content of carbonate groups, calculated as $CO_2$ in the polyether carbonate polyol is ≥3 and ≤35% by weight, preferably ≥5 and ≤30% by weight, particularly preferably ≥10 and ≤28% by weight. The determination method is NMR, using the analysis method specified in the section concerning experimental methods.

In another preferred embodiment of the invention, the number-average molar mass $M_n$, of the polyether carbonate polyol is ≥500 and ≤10000 g/mol, preferably 500 and ≤7500 g/mol, particularly preferably ≥750 and ≤6000 g/mol and very particularly preferably ≥1000 and ≤5000 g/mol. The determination method is titration of the terminal OH groups, using the analysis method specified in the section concerning experimental methods under 01-1 number determination.

It is preferable that the average OH functionality of the polyether carbonate polyol is ≥1.90 and ≤2.30, preferably ≥1.93 and ≤2.20, particularly preferably 2≥1.96, and ≤2.05 and very particularly preferably ≥1.98 and ≤2.02.

Production of the polyether carbonate polyols can generally use alkylene oxides (epoxides) having from 2 to 24 carbon atoms. Examples of the alkylene oxides having from 2 to 24 carbon atoms are one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats in the form of mono-, di-, and triglyceride, epoxidized fatty acids, $C_1$-$C_{24}$-esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate, and also epoxy-functional alkoxysilanes, for example 3-glycidyloxypropyltrimethoxysilane, 3-glycidyloxypropyltriethoxysilane, 3-glycidyloxypropyltripropoxysilane, 3-gycidyloxypropylmethyldimethoxysitane, 3-glycidyloxypropylethyldiethoxysilane, 3-glycidyloxypropyltriisopropoxysilame. It is preferable to use, as alkylene oxides, ethylene oxide and/or propylene oxide, in particular propylene oxide.

In one particularly preferred embodiment of the invention, the proportion of ethylene oxide in the entire quantity used of the alkylene oxides is ≥0 and ≤90% by weight, preferably ≥0 and ≤50% by weight, particularly preferably ≥0 and ≤25% by weight.

Compounds having H atoms that are active in relation to alkoxylation can be used as suitable 11-functional starter substance. Examples of groups that are active in relation to alkoxylation, having active H atoms, are —OH, —NH$_2$ (primary amines), —NH— (secondary amines), —SH, and —CO$_2$H. Preference is given to —OH and —NH$_2$, particularly preference being given to —OH. By way of example, one or more compounds selected from the group consisting of polyhydric alcohols, polyfunctional amines, polyfunctional thiols, amino alcohols, thin alcohols, hydroxyesters, polyether polyols, polyester polyols, polyester ether polyols, polyether carbonate polyols, polycarbonate polyols, polycarbonates, polyethyleneimines, polyether amines (e.g. those known as Jeffamine® from Huntsman), polytetrahydrofurans (e.g. PolyTHF® from BASF, e.g. PolyTHF® 250, 650S, 1000, 1000S, 1400, 1800, 2000), polytetrahydrofuranamincs (BASF product polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and alkyl fatty acid esters, where these comprise an average of at least two OH groups per molecule, can be used as H-functional starter substance. The $C_1$-$C_{24}$ alkyl fatty acid esters, where these comprise an average of at least two OH groups per molecule, are by way of example commercially available products such as Lupranol Balance® (BASF AG), Merginol® grades (Hobum Oleocheinicals GmbH), Sovermol® grades (Cognis Deutschland GmbH & Co. KG), and Soyol®TM grades (USSC Co.).

Examples of polyhydric alcohols suitable as H-functional starter substances are dihydric alcohols, e.g. ethylene glycol, diethylene glycol, propylene glycol, dipropylene 1,3-propanediol, 1,4-butanediol, 1,4-butenediol, 1,4-butynediol, neopentyl glycol, 1,5-pentanediol, methylpentanediol (e.g. 3-methyl-1,5-pentanediol), 1,6-hexanediol; 1,8-octanediol, 1,10-decanediol, 1,12-dodecanediol, bis(hydroxymethyl)cyclohexanes (e.g. 1,4-bis(hydroxymethyl)cyclohexane), triethylene glycol, tetraethylene glycol, polyethylene glycol, dipropylene glycol, tripropylene glycol, polypropylene glycol, dibutylene glycol, and polybutylene glycols, and also all of the modification products of these abovementioned alcohols with various quantities of ε-caprolactone. Mixtures of H-functional starters can also use trihydric alcohols, for example trimethylolpropane, glycerol, trishydroxyethyl isocyanurate, and castor oil.

The H-functional starter substances can also be selected from the polyether polyols substance class, in particular those with a number-average molar mass $M_n$ in the range from 200 to 4000 g/mol, preferably from 250 to 2000 g/mol. Preference is given to polyether polyols composed of repeating units of ethylene oxide and of propylene oxide, preferably having a proportion of from 35 to 100% of propylene oxide units, particularly preferably having a proportion of from 50 to 100% of propylene oxide units. These can be random copolymers, gradient copolymers, or alternating or block copolymers of ethylene oxide and propylene oxide. Examples of suitable polyether polyols composed of repeating units of propylene oxide and/or of ethylene oxide are the Desmophen®-Acclaim®-Arcol®-, Baycoll®, Bayfill®, Bayflex®-, Baygal®-, PET®-, and polyether polyols from Bayer MaterialScience AG (e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S 180). Examples of other suitable homopolyethylene oxides are the Pluriol® F grades from BASE SE, and examples of suitable homopolypropylene oxides are the Pluriol® P grades from BASF SE, and examples of suitable mixed copolymers of ethylene oxide and propylene oxide are the Pluronic® PE or Pluriol® RPE grades from BASF SE.

The H-functional starter substances can also be selected from the polyester polyols substance class, in particular those with a number-average molar mass M in the range from 200 to 4500 g/mol, preferably from 400 to 2500 g/mol. Polyester polyols used comprise at least difunctional polyesters. Polyester polyols are preferably composed of alternating acid units and alcohol units. Examples of acid components used are succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, and mixtures of the acids and/or anhydrides mentioned. Examples of alcohol components used are 1,2-ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, and mixtures of the alcohols mentioned. If dihydric or polyhydric polyether polyols are used as alcohol component, polyester ether polyols are thus obtained and can likewise serve as starter substances for the production of the polyether carbonate polyols. If polyether polyols are used for the production of the polyester ether polyols, preference is given to polyether polyols with a number-average molar mass $M_n$ of from 150 to 2000 g/mol.

Other H-functional starter substances that can be used are polycarbonate polyols, for example polycarbonate diols, in particular those with a number-average molar mass M in the range from 150 to 4500 g/mol, preferably from 500 to 2500 g/mol these being produced by way of example via reaction of phosgene, dimethyl carbonate, diethyl carbonate, or diphenyl carbonate and di- and/or polyhydric alcohols, or polyester polyols, or polyether polyols. Examples of polycarbonate polyols are found by way of example in EP 1359177 A. Polycarbonate diols used can by way of example comprise the Desmophen® C grades from Bayer MaterialScience AG, e.g. Desmophen® C 1100 or Desmophen® C 2200.

Polyether carbonate polyols can likewise be used as H-functional starter substances. In particular, polyether carbonate polyols produced by the process described here are used. These polyether carbonate polyols used as H-functional starter substances are produced in advance for this purpose in a separate reaction step.

The functionality (i.e. number of H atoms per molecule that are active in relation to polymerization) of the H-functional starter substances is generally from 1 to 4, preferably 2 or 3, and particularly preferably 2. The H-functional starter substances are used either individually or in the form of mixture of at least two H-functional starter substances.

Preferred H-functional starter substances are alcohols of the general formula (I),

$$HO—(CH_2)_x—OH \qquad (I)$$

where x is a number from 1 to 20, preferably an even number from 2 to 20. Examples of alcohols of formula (I) are ethylene glycol, 1,4-butanediol, 1,6-hexanediol, 1,8-octanediol, 1,10-decanediol, and 1,12-dodecanediol. Other preferred H-functional starter substances are neopentyl glycol, trimethylolpropane, glycerol, pentaerythritol, reaction products of the alcohols of formula (I) with ε-caprolactone, e.g. reaction products of trimethylolpropane with ε-caprolactone, reaction products of glycerol with ε-caprolactone, and also reaction products of pentaerythritol with ε-caprolactone. Preference is further given to the following H-functional starter substances: water, diethylene glycol, dipropylene glycol, castor oil, sorbitol, and polyether polyols composed of repeating units of polyalkylene oxides.

It is particularly preferable that the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trihydric polyether polyols, where the polyether polyol is composed of a di- or tri-H-functional starter substance and propylene oxide or of a di or tri-H-functional starter substance, propylene oxide, and ethylene oxide. The number-average molar mass $N_4$ of the polyether polyols is preferably in the range from 62 to 4500 g/mol, and in particular in the range from 62 to 3000 g/mol, very particularly preferably from 62 to 1500 g/mol. The functionality of the polyether polyols is preferably from 2 to 3, particularly preferably 2.

In one preferred embodiment of the invention, the polyether carbonate polyol is obtainable via an addition reaction of carbon dioxide and of alkylene oxides onto H-functional starter substances with the use of multimetal cyanide catalysts (DMC catalysts). The production of polyether carbonate polyols via an addition reaction of alkylene oxides and $CO_2$ onto H-functional starters with the use of DMC catalysts is disclosed by way of example in EP 0222453 A, WO 2008/013731 A, and EP 2115032 A.

DMC catalysts are in principle known from the prior art relating to the homopolymerization of epoxides (see for example U.S. Pat. No. 3,404,109 A, U.S. Pat. No. 3,829,505 A, U.S. Pat. No. 3,941,849 A, and U.S. Pat. No. 5,158,922 A). DMC catalysts described by way of example in U.S. Pat. No. 5,470,813 A, EP 700 949 A, EP 743 093 A, EP 761 708 A, WO 97/40086 A, WO 98/16310 A and WO 00/47649 A have very high activity in the homopolymerization of epoxides, and permit the production of polyether polyols at very low catalyst concentrations (25 ppm or less). The high-activity DMC catalysts described in EP-A 700 949 are a typical example, and comprise not only a double metal cyanide compound (e.g. zinc hexacyanocobaltate(III)) and an organic ligand (e.g., tert-butanol), but also a polyether with a number-average molar mass greater than 500 g/mol.

The quantity used of the DMC catalyst is mostly smaller than 1% by weight, preferably smaller than 0.5% by weight, particularly preferably smaller than 500 ppm, and in particular smaller than 300 ppm, based in each case on the weight of the polyether carbonate polyol.

The polyether carbonate polyols are preferably produced in a pressure reactor. One or more alkylene oxides, and the carbon dioxide, are metered into the system after the optional drying of a starter substance or of the mixture of a plurality of starter substances, and the addition of the DMC catalyst, and also of the additive(s), these being added in the form of solid or in the form of a suspension before or after the drying process. In principle, various methods can be used for the metering of one or more alkylene oxides and of the carbon dioxide into the system. The metering can be started in vacuo or at a preselected admission pressure. It is preferable to set the admission pressure via introduction of an inert gas, for example nitrogen, where the pressure set is from 10 mbar to 5 bar, preferably from 100 mbar to 3 bar, and with preference from 500 mbar to 2 bar.

The metering of one or more alkylene oxides and of the carbon dioxide into the system can take place simultaneously or sequentially, and the entire quantity of carbon dioxide here can be added all at once or metered into the system during the reaction time. Preference is given to metering of the carbon dioxide into the system. One or more alkylene oxides is/are metered into the system simultaneously or sequentially in relation to the metering of the carbon dioxide into the system. If a plurality of alkylene oxides are used for the synthesis of the polyether carbonate polyols, these can be metered into the system simultaneously or sequentially by way of respective separate feeds, or by way of one or more feeds where at least two alkylene oxides are metered in the form of mixture into the system. It is possible to synthesize random, alternating, block-type, or gradient-type polyether carbonate polyols by varying the way in which the alkylene oxides and the carbon dioxide are metered into the system.

It is preferable to use an excess of carbon dioxide, and in particular the quantity of carbon dioxide is determined by way of the total pressure under reaction conditions. An excess of carbon dioxide is advantageous because carbon dioxide is unreactive. The reaction has been found to produce the polyether carbonate polyols at from 60 to 150° C., preferably from 70 to 140° C., particularly preferably from 80 to 130° C., and at pressures of from 0 to 100 bar, preferably from 1 to 90 bar, and particularly preferably from 3 to 80 bar. At temperatures below 60° C. the reaction ceases. At temperatures above 150° C., the quantity of undesired by-products increases sharply.

The proportion of polyether carbonate polyols, based on the total mass of component B), is preferably ≥5 and ≤100% by weight, particularly preferably ≥20 and ≤100% by weight, and very particularly preferably ≥40 and ≤100% by weight. It is also possible that various polyether carbonate polyols are present in component B).

It is also possible to use, as component B), mixtures of the abovementioned polyether carbonate polyols with other linear hydroxy-terminated polyols with a number-average molar mass $M_n$ of from 500 to 5000 g/mol, preferably from 750 to 4000 g/mol, and particularly preferably from 1000 to 3000 g/mol. By virtue of the production process, these often comprise small quantities of nonlinear compounds. An expression therefore often used is "essentially linear polyols". Preferred other polyols are polyester diols, polyether diols, polycarbonate diols, and mixtures of these.

Suitable polyether diols can thus be produced by reacting one or more alkylene oxides having from 2 to 4 carbon atoms in the alkylene moiety with a starter molecule which comprises two active hydrogen atoms. Examples that may be mentioned of alkylene oxides are: ethylene oxide, 1,2-propylene oxide, epichlorohydrin, and 1,2-butylene oxide, and 2,3-butylene oxide. It is preferable to use ethylene oxide, propylene oxide, and mixtures of 1,2-propylene oxide and ethylene oxide. The alkylene oxides can be used individually, in alternating succession, or in the form of mixtures. Examples of starter molecules that can be used are: water, amino alcohols, for example N-alkyldiethanolamines, for example N-methyldiethanolamine, and diols, for example ethylene glycol, 1,3-propylene glycol, 1,4-butanediol, and 1,6-hexanediol. Mixtures of starter molecules can optionally also be used. Other suitable polyether diols are the tetrahydrofuran polymerization products containing hydroxyl groups. It is also possible to use proportions of from 0 to 30%, based on the bifunctional polyethers, of trifunctional polyethers, the quantity of these being however at most that which produces a thermoplastically processible product. The average molar masses $M_n$ of suitable polyether diols is from 500 to 6000 g/mol, preferably from 750 to 4000 g/mol, and very particularly preferably from 1000 to 3000 g/mol. They can be used either individually or else in the form of mixtures with one another.

Suitable polyester diols can by way of example be produced from dicarboxylic acids having from 2 to 12 carbon atoms, preferably having from 4 to 6 carbon atoms, and from polyhydric alcohols. Examples of dicarboxylic acids that can be used are: aliphatic dicarboxylic acids, for example succinic acid, maleic acid, glutaric acid, adipic acid, suberic acid, azelaic acid, and sebacic acid, and aromatic dicarboxylic acids, for example phthalic acid, isophthalic acid, and terephthalic acid. The dicarboxylic acids can be used individually or in the form of mixtures, e.g. in the form of a succinic, glutaric, and adipic acid mixture. For the production of the polyester diols it can optionally be advantageous to use, instead of the dicarboxylic acids, the corresponding dicarboxylic acid derivatives, for example carboxylic diesters having from 1 to 4 carbon atoms in the alcohol moiety, carboxylic anhydrides, or acyl chlorides. Examples of polyhydric alcohols are glycols having from 2 to 10, preferably from 2 to 6, carbon atoms, for example ethylene glycol, diethylene glycol, 1,4-butanediol, 1,5-pentanediol, 1,6-hexanediol, 1,10-decanediol, 1,12-dodecanediol, 2,2-dimethyl-1,3-propanediol, 1,3-propanediol, and dipropylene glycol. The polyhydric alcohols can be used alone or optionally in a mixture with one another, as required by the desired properties. Other suitable compounds are esters of carbonic acid with the diols mentioned, in particular those having from 4 to 6 carbon atoms, for example 1,4-butanediol or 1,6-hexanediol, condensates of hydroxycarboxylic acids, for example hydroxycaproic acid, and polymerization products of lactones, for example optionally substituted caprolactones. Preferred polyester diols used are ethanediol polyadipates, 1,4-butanediolpolyadipates, ethanediol 1,4-butanediol polyadipates, 1,6-hexanediol neopentyl glycol polyadipates, 1,6-hexanediol 1,4-butanediol polyadipates, and polycaprolactones. The number-average molar mass $M_n$ of the polyester diols is from 500 to 5000 g/mol, preferably from 600 to 4000 g/mol, and particularly preferably from 800 to 3000 g/mol, and they can be used individually or in the form of mixtures with one another.

Chain extenders C) used can comprise low-molecular-weight compounds with a molar mass of ≥60 and ≤490 g/mol, preferably ≥62 and ≤400 g/mol, and particularly preferably ≥62 and ≤300 g/mol, where these have two isocyanate-reactive groups.

In one preferred embodiment of the invention, the chain extenders C) comprise, or consist of diols, diamines, or diol/diamine mixtures, however preferably diols.

Suitable chain extenders are diols such as ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, diesters of terephthalic acid with glycols having from 2 to 4 carbon atoms, for example bis(ethylene glycol) terephthalate or bis(1,4-butanediol) terephthalate, hydroxyalkylene ethers of hydroquinone, for example 1,4-di(hydroxyethyl)hydroquinone, and ethoxylated bisphenols, and also reaction products of these with ε-caprolactone.

Preferred chains extenders are aliphatic diols having from 2 to 14 carbon atoms, for example ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, and 1,4-di(hydroxyethyl)hydroquinone. Particular preference is given to the use of 1,3-propanediol, 1,4-butanediol, 1,6-hexanediol, and 1,4-di(hydroxyethyl)hydroquinone as chain extender.

Other suitable chain extenders are (cyclo)aliphatic diamines, for example isophoronediamine, ethylenediamine, 1,2-propylenediamine, 1,3-propylenediamine, N-methylpropylene-1,3-diamine, N,N'-dimethylethylenediamine, and aromatic diamines, for example 2,4-tolylenediamine and 2,6-tolylenediamine, 3,5-diethyl-2,4-tolylenediamine, and 3,5-diethyl-2,6-tolylenediamine, and primary mono-, di-, tri-, or tetraalkyl-substituted 4,4'-diaminodiphenylmethanes.

Relatively small quantities of triols may also be added.

Chain terminators D) that can be used are low-molecular-weight compounds having an isocyanate-reactive group, for example monoalcohols or monoamines. It is preferable to use at least one compound selected from the group of 1-octanol, stearyl alcohol, 1-butylamine, and stearylamine, and it is particularly preferable to use 1-octanol, The TPUs can be produced by reacting quantities of the structural components such that the molar ratio of the isocyanate groups from A) to the entirety of the groups in B), C), and optionally D) reactive toward isocyanate is ≥0.9:1 and ≤1.2:1, preferably ≥0.92:1 and ≤1.15:1, and particularly preferably ≥0.94 and ≤1.10:1, The Shore hardness of the TPUs produced via the processes of the invention can be varied widely, fir example from Shore A 45 to Shore II) 90, via adjustment of the molar ratio of polyol B) to chain extender C).

Suitable catalysts E) can optionally be used in the process of the invention. The conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane, and also organometallic compounds, for example titanium compounds, iron compounds, or tin compounds, for example tin diacetate, tin dioctanoate, tin dilaurate, or the dialkyltin salts of aliphatic carboxylic acids, for example dibutyltin diacetate or dibutyltin dilaurate, are suitable catalysts fir the production of TPUs. Preferred catalysts are organometallic compounds, in particular titanium compounds or iron compounds or tin compounds.

The total quantity of catalysts in the TPUs is generally about 0 to 5% by weight, preferably from 0.0001 to 1% by weight, and particularly preferably from 0.0002 to 0.5% by weight.

It is moreover also possible to add auxiliaries and/or additional substances during the process of the invention. Mention may be made by way of example of lubricants, for example fatty acid esters, metal soaps of these, fatty acid amides, fatty acid ester amides, and silicone compounds, antiblocking agents, inhibitors, stabilizers with respect to hydrolysis, UV or other light, heat, and discoloration, flame retardants, dyes, pigments, inorganic and/or organic fillers, and reinforcing agents. Reinforcing agents are in particular fibrous reinforcing materials, e.g. inorganic fibers, where these are produced in accordance with the prior art and can also have been treated with a size. Information in greater detail concerning the auxiliaries and additional substances mentioned can be found in the technical literature, for example in the monograph by J. H. Saunders and K. C. Fisch *"High Polymers", volume XVI, Polyurethane, Parts 1 and 2*, Verlag Interscience Publishers 1962 and 1964, and *Taschenbuch für Kunststoft:Additive [Plastics additives handbook]* by R. Gachter and H Müller (Hanser Verlag Munich 1990), or DE 29 01 774 A.

Other additions that can be incorporated into the TPUs are thermoplastics, for example polycarbonates and acrylonitrile/butadiene/styrene terpolymers (ABS). It is also possible to use other elastomers, for example rubber, ethylene/vinyl acetate copolymers, styrene/butadiene copolymers, and also other TPUs. Other compounds suitable for incorporation are commercially available plasticizers, for example phosphates, phthalates, adipates, sebacates, and alkylsulforiates.

One preferred embodiment of the process of the invention reacts components A), B) and C), and optionally D) and E) in a one-shot process, i.e. in one step.

This "one-shot process" is particularly suitable for the production of the TPUs of the invention. It is possible here to use components B), C) and optionally D) as initial charge in a reaction vessel and to heat these to a particular starting temperature. The starting temperature is preferably ≥100 and ≤250° C., particularly preferably ≥100 and ≤220° C. A catalyst E) is then optionally added, the isocyanate component A) then being added in one portion. It is possible to select the reaction temperatures and reaction times freely, as required by the reactivity of the chain extender C). It is preferable to continue the reaction until the maximum possible stirrer torque is reached, and the reaction melt can then be poured onto a metal sheet and then conditioned for a certain time, for example from 30 to 120 minutes, with a certain temperature range, from example from 80 to 120° C. After the resultant TPU sheets have cooled, they can be chopped and granulated. The resultant granulated TPU material can then be processed by thermoplastic route, e.g. in an injection-molding machine.

It is likewise possible, although less preferred, to carry out the process of the invention in a plurality of stages, by what is known as the prepolymer process. For the production of thermoplastic polyurethane by the prepolymer process, components A) and B) are preferably reacted in a first step, optionally in the presence of catalyst E) at a temperature of ≥100 and ≤250° C., preferably ≥100 and ≤220° C., to give an NCO-terminated prepolymer, it is preferable here that the components are intimately mixed with one another and that the prepolymer reaction is carried out in essence to complete conversion, based on the polyol component. Complete conversion can be checked via titration of the NCO content. In a second step, the NCO-terminated prepolymer is then reacted with the components C) chain extender and optionally D) chain terminator, and optionally further organic diisocyanate, optionally in the presence of E) catalysts. The reaction temperatures selected here are preferably the same as those during the production of the prepolymer. The procedure then continues as described, above for the one-shot process, The TPUs can be produced either batchwise or continuously. The best-known industrial production processes used for this purpose are the mixing-head-belt process (GB 1 057 018 A) and the extruder process (DE 1 964 834 A, DE 2 059 570 A, and U.S. Pat. No. 5,795,948 A).

The known mixing assemblies are suitable for the process of the invention for the production of TPUs, preference being given to those operating with high shear energy. For the continuous production process mention may be made by way of example of co-kneaders, preferably extruders, for example twin-screw extruders and Buss kneaders.

In one preferred embodiment of the invention, the reaction of the components takes place in a reactive extruder or by the mixing-head-belt process.

The invention further provides a thermoplastic polyurethane elastomer obtainable by the process described above of the invention.

The invention further provides the use of the thermoplastic polyurethane elastomers produced by the process of the invention for the production of injection-molded or extruded items, and also the actual items that are objects of the invention produced via injection molding or extrusion.

The parts produced from the TPUs of the invention harden rapidly when processed by injection molding, and therefore have good demoldability. The injection-molded parts have high dimensional stability and are very heat-resistant.

The TPUs of the invention can be used for the production of a very wide variety of useful parts appropriate to their level of hardness, for example for the production of soft, flexible injection-molded parts, for example shoe soles, grip recesses, sealing parts, and dust caps, and also for harder parts, for example rollers, conveyor belts, ski boots, etc. Combination with other thermoplastics gives products with attractive grip feel (hard-soft combination).

The materials can also be used to produce extruded items, e.g. profiles, films, foils, and hoses.

The examples below will provide further explanation of the invention.

EXAMPLES

The following methods were used to characterize the polymeric polyols used:

The $CO_2$ content incorporated within the polyether carbonate polyols was determined by means of $^1$H NMR (Bruker, DPX 400, 400 MHz: pulse program zg30, delay d1: 5 s, 100 scans). In each case the sample was dissolved in deuterated chloroform. Internal standard added to the deuterated solvent comprised dimethyl terephthalate (2 mg for every 2 g of $CDCl_3$). The relevant resonances in the $^1$H NMR (based on MCI; =7.24 ppm) are as follows:

Carbonates, resulting from carbon dioxide incorporated within the polyether carbonate polyol (resonances at from 5.2 to 4.8 ppm) PO not consumed in the reaction with resonance at 2.4 ppm, polyether polyol (i.e. without incorporated carbon dioxide) with resonances at from 1.2 to 1.0 ppm.

The molar content of the carbonate incorporated within the polymer, of the polyether polyol fractions, and also of the PO not consumed in the reaction are determined via, integration of the corresponding signals.

All of the number-average molar masses $M_n$ stated in the description and in the examples for the polymeric polyols were determined as follows: the OH number was first determined experimentally via esterification followed by back-titration of the excess esterification reagent with standard alcoholic potassium hydroxide solution in accordance with DIN 53240-2. The OH number is stated in mg KOH per gram of polyol. The number-average molar mass can be calculated from the OH number by way of the following formula: number-average molar mass $M_n = 56 \times 1000 \times OH$ functionality/OH number. The OH functionality F was assumed to be approximately 2.

In the case of low-molecular-weight polyols with defined structure, the molar mass is calculated from the molecular formula.

Production of TPUs 1 and 2

The appropriate polyol, 1,6-hexanediol and 1% Irganox® 1010 (product available commercially from BASF SE, Ludwigshafen) were used as initial charge in a reaction vessel as in table 1 and heated to 120° C., with stirring. 30 ppm of dibutyltin dilaurate were then added as catalyst. The hexamethylene diisocyanate (HDI), heated to 110° C., was then added in one portion, with stirring. The reaction temperature reached a temperature maximum of about 190° C., and was stirred for about 90 to 105 sec until the maximum possible torque of the stirrer was reached. The reaction mixture was then poured onto a coated metal sheet and subjected to postconditioning at 80° C. for 30 minutes. After cooling, this gave a cast TPU sheet.

Table 1 describes the components used, and proportions thereof, for the production of the TPUs.

TABLE 1

Molar proportions of the starting components for the synthesis of the TPUs

| Example | Polyol No. | Polyol [mol] | HDI [mol] | 1,6-Hexanediol [mol] |
|---|---|---|---|---|
| 1 | 2 | 1 | 3.1 | 2.1 |
| 2* | 1 | 1 | 3.1 | 2.1 |

Polyol 1: Acclaim ® 2200 (polypropylene oxide glycol with OH number 56.7 mg KOH/g ($M_n$ = 1979 g/mol, from Bayer MaterialScience AG).
Polyol 2: Polyether carbonate diol based on propylene oxide and $CO_2$ with OH number 58.2 mg KOH/g ($M_n$ = 1928 g/mol) and with 15.1% by weight $CO_2$ content.
*comparative example not of the invention Studies on TPUs 1 and 2:

The resultant cast TPU sheets were chopped and granulated. The granulated material was processed in an Arburg Allrounder 470S injection-molding machine in a temperature range from 180 to 230° C. and in a pressure range from 650 to 750 bar with an injection flow rate of from 10 to 35 cm³/s to give bars (mold temperature: 40° C.; bar size: 80×10×4 mm) and sheets (mold temperature: 40° C.; size: 125×50×2 mm).

The following test methods were used:

Hardness was measured in accordance with DIN 53505, the tensile test was carried out in accordance with ISO 37 and abrasion was measured in accordance with DIN ISO 4649-A.

Dynamic mechanical analysis (DMA: storage-tensile modulus of elasticity):

Rectangles (30 mm×10 mm×2 mm) were punched out from the injection-molded sheets. These test sheets, under constant preload—where appropriate dependent on the storage modulus—were subjected to periodic excitation with very small deformations, and the force acting on the clamp system was measured as a function of the temperature and excitation frequency.

The preload additionally applied serves to retain adequate clamping of the sample when deformation amplitude is negative.

The DMA measurements were taken using a Seiko DMS 210 at 1 Hz in the temperature range from −150° C. to 200° C. with a heating rate of 2° C./min.

The behavior of the invention under warm conditions was characterized by measuring and stating the storage-tensile modulus of elasticity at +20° C. and at +60° C., for comparison.

Heat resistance is characterized by stating the temperature at which the value is less than 2 MPa, i.e. the injection-molded part no longer retains a stable shape. The higher the temperature value, the more stable the TPU.

Table 2 describes the properties determined for the TPUs 1 and 2.

TABLE 2

Results

| | Example | |
|---|---|---|
| | 1 | 2* |
| Immediate hardness [Shore A] | 83 | 83 |
| Abrasion [mm³] | 58 | 84 |
| 100% modulus [MPa] | 6.13 | 4.3 |
| 300% modulus [MPa] | 8.65 | 6.45 |
| Tensile strength [MPa] | 16.5 | 10.2 |
| Tensile strain value [%] | 728 | 751 |
| DMA measurement: | | |
| Modulus of elasticity (20° C.) [MPa] | 23 | 19 |
| Modulus of elasticity (60° C.) [MPa] | 15 | 0 |
| T (2 MPa) [° C.] | 119.7 | 103.6 |

*comparative example not of the invention

The TPU of the invention and the TPU not of the invention have equally high hardness. The TPU of the invention has a markedly better level of mechanical properties than the comparative product, this being particularly apparent from the 100% modulus, 300% modulus and tensile strength. The modulus of elasticity values from DMA at ±20° C. and at +60° C. are markedly higher for example 1 than for the corresponding comparative example 2, as also is the temperature at which a minimum stress of 2 MPa is retained. At high temperatures, the TPU of the invention is therefore markedly more heat-resistant than the comparative TPU. The abrasion value is also markedly lower for the TPU of the invention than for the comparative TPU.

What is claimed is:

1. A process for the production of an injection-molded or extruded item comprising preparing a thermoplastic polyurethane elastomer by reacting, in a one-shot process in a reactive extruder or by a mixing-head-belt process, at least
   A) one organic diisocyanate comprising two isocyanate groups, with
   B) one polyol with number-average molar mass $M_n$ ≥500 and ≤5000 g/mol, which has at least two isocyanate-reactive groups, and
   C) one or more diols with molar mass ≥60 and ≤490 g/mol, selected from the group consisting of ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, bis(ethylene glycol) terephthalate, bis(1,4-butanediol) terephthalate, 1,4-di(hydroxyethyl) hydroquinone, and ethoxylated bisphenols, and also reaction products of any of these with ϵ-caprolactone, and optionally
   D) a monofunctional chain terminator which has an isocyanate-reactive group and/or in the presence of
   E) a catalyst
   where the molar ratio of the entirety of the isocyanate groups from A) to the entirety of the groups in B), C), and optionally D) reactive toward isocyanate is ≥0.9:1 and ≤1.2:1, and component B) comprises at least one polyether carbonate polyol obtainable via an addition reaction of carbon dioxide and a mixture of 75 to 100% by weight of propylene oxide and 0 to 25% by weight of ethylene oxide onto H-functional starter substances, and granulating the thermoplastic polyurethane elastomer to form a granulated thermoplastic polyurethane elastomer.

2. The process as claimed in claim 1, wherein the polyether carbonate polyol is obtainable via an addition reaction of carbon dioxide and a mixture of 75 to 100% by weight of propylene oxide and 0 to 25% by weight of ethylene oxide onto H-functional starter substances with the use of multimetal cyanide catalysts.

3. The process as claimed in claim 1, wherein the content of carbonate groups, calculated as $CO_2$ in the polyether carbonate polyol is ≥3 and ≤35% by weight.

4. The process as claimed in claim 1, wherein the number-average molar mass $M_r$, of the polyether carbonate polyol is ≥500 and ≤10000 g/mol.

5. The process as claimed in claim 1, wherein the average OH functionality of the polyether carbonate polyol is ≥1.85 and ≤2.5.

6. The process as claimed in claim 1, wherein the organic diisocyanate A) comprises at least one aliphatic and/or one cycloaliphatic diisocyanate.

7. The process as claimed in claim 1, wherein component B) comprises at least one polyether carbonate polyol and at least one polyether polyol.

8. The process as claimed in claim 1, wherein component B) comprises at least one polyether carbonate polyol and at least one polyester polyol.

9. The process as claimed in claim 1, wherein component B) comprises at least one polyether carbonate polyol and at least one polycarbonate polyol.

10. The process as claimed in claim 1, wherein component B) comprises two polyether carbonate polyols that differ from one another.

11. An injection-molded or extruded item obtained by a process as claimed in claim 1.

12. The process as claimed in claim 1, wherein the organic diisocyanate A) comprises at least one aliphatic and/or one cycloaliphatic diisocyanate, wherein the content of carbonate groups, calculated as $CO_2$ in the polyether carbonate polyol is ≥3 and ≤35% by weight, and wherein component C) comprises a diol.

13. The process as claimed in claim 1, wherein the average OH functionality of the polyether carbonate polyol is ≥1.96 and ≤2.05.

14. The process as claimed in claim 1, wherein the proportion of polyether carbonate polyols, based on the total mass of component B), is ≥20 and ≤100% by weight.

15. The process as claimed in claim 1, wherein the organic diisocyanate A) is hexamethylene 1,6-diisocyanate, wherein the content of carbonate groups, calculated as $CO_2$ in the polyether carbonate polyol is ≥10 and ≤28% by weight, and wherein component C) comprises a diol.

* * * * *